B. BOMBORN & A. HOFFMANN.
SELF CENTERING CHUCK.
APPLICATION FILED MAR. 16, 1909.
942,304.
Patented Dec. 7, 1909.
2 SHEETS—SHEET 2.
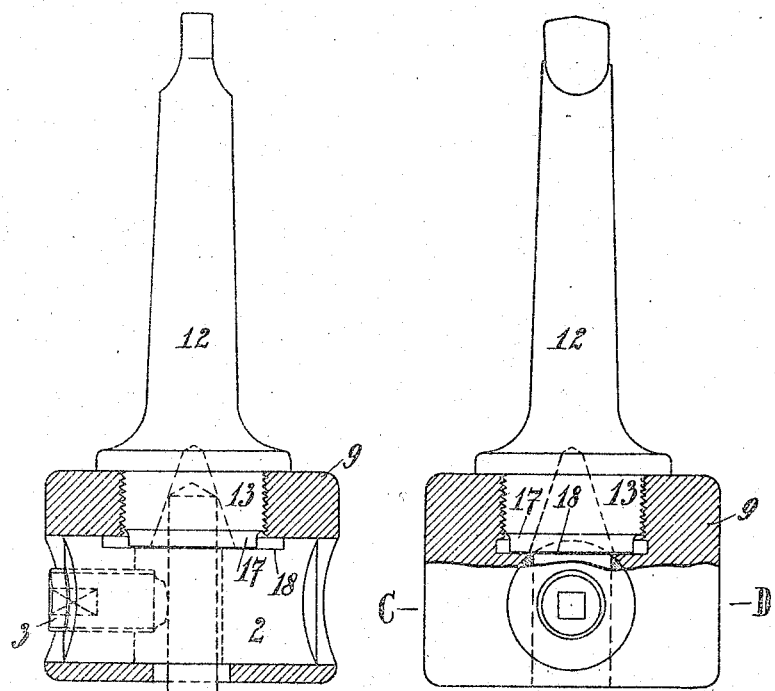
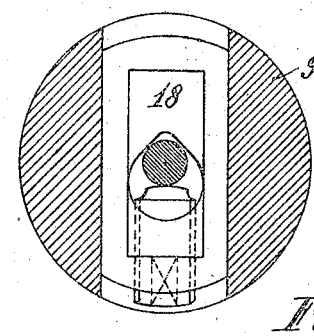
Witnesses.
Inventors.
Reinhard Bomborn
Alexander Hoffmann

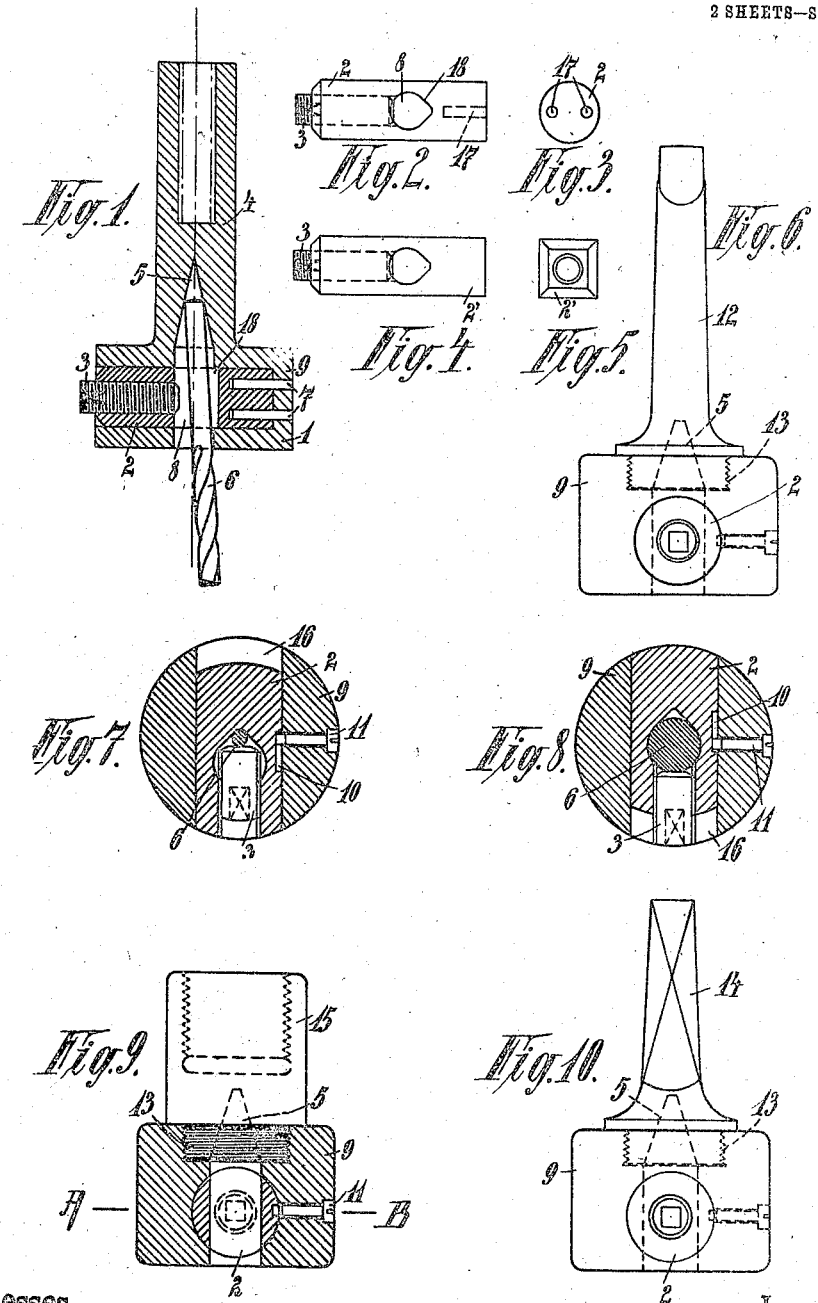

UNITED STATES PATENT OFFICE.

BERNHARD BOMBORN AND ALEXANDER HOFFMANN, OF BERLIN, GERMANY; SAID HOFFMANN ASSIGNOR TO SAID BOMBORN.

SELF-CENTERING CHUCK.

942,304.  Specification of Letters Patent.  Patented Dec. 7, 1909.

Application filed March 16, 1909. Serial No. 483,762.

*To all whom it may concern:*

Be it known that we, BERNHARD BOMBORN, engineer, citizen of the Kingdom of Prussia, residing at Berlin, in the Empire of Germany, and ALEXANDER HOFFMANN, engineer, citizen of the Empire of Russia, residing at Berlin, in the Empire of Germany, have invented certain new and useful Improvements in Self-Centering Chucks, of which the following is a specification.

This invention relates to automatically centering chucks for boring and drilling machines or lathes and has for its object to provide a simple, cheap and efficient device, which may be connected with or formed in the face plate or surface plate of such machines, for automatically centering the drills.

The invention consists in providing the chuck with a central recess to receive the shank of the drill, and a bore extending through the chuck-head arranged transversely to the axis of the recess, said bore containing a gripping-device which comprises a core movable longitudinally of the bore and having a transverse aperture whose wall or walls are parallel to the axis of said recess against which wall the drill is clamped by means of a screw or screws working in the core, means being provided to prevent displacement of the core in any direction other than longitudinal displacement.

In the accompanying drawings we have shown in detail certain advantageous forms of embodiment of the invention and in which—

Figure 1 is a longitudinal section of one form of clutch. Fig. 2 is a detail plan view of the gripping device. Fig. 3 is an end view of the latter. Figs. 4 and 5 are views like Figs. 2 and 3 respectively of a modified form of gripping device. Fig. 6 is an elevation of a modified form of chuck. Figs. 7 and 8 are cross sections on line A—B, of Fig. 9 and showing the core in different positions due to the difference in the size of the drills. Fig. 9 is a sectional view of a chuck attached to a lathe head shown in elevation. Fig. 10 is an elevation of the clutch provided with a modified form of stock. Fig. 11 is an elevation partly in section of further modified forms of chuck. Fig. 12 is a similar view of the left side of Fig. 11 and Fig. 13 is a section on line C—D of Fig. 12.

Referring to Fig. 1, the numeral 4 designates the stock of the chuck having a centered conical recess 5 and an integral head portion 9 which latter has a cylindrical bore 16 which extends through the head and whose longitudinal axis is perpendicular to the axis of the recess 5. In the bore 1 is mounted a core 2 adapted to move longitudinally therein but held against rotation by means of pins 7 fixed in the head and projecting into corresponding holes 17, Fig. 3, formed in one end of the core. The pins may be dispensed with and rotation of the core in the bore may be prevented by forming the core as 2', and bore rectangular in cross section as shown in Figs. 4 and 5. The core 2 is further provided with a transverse slot 8 preferably of the form shown in Figs. 2 and 4 which registers with the recess 5 and with an aperture in the chuck-head diametrically opposite said recess. The wall 18 of said slot 8 is parallel to the axis of the recess 5, and a screw or screws 3, one of which is shown, works in the core to and from said wall and perpendicular thereto.

When a drill or similar tool as 6 is inserted into the chuck the end of the shank of the tool engages the centering walls of the recess 5 and the screw 3 is then turned and caused to engage said shank. The pressure of the screw on the shank will bring the wall 18 of the slot 8 into engagement with the shank and when the latter rests flat against said wall the tool will be accurately and automatically centered.

Instead of forming the stock and chuck in one piece, as above described, they may be made separate, the stock 12, Figs. 6, 11 and 12 and stock 14, Fig. 10 which is made square, being provided with screw threads 13 which screw into a threaded socket formed in the head 9. The formation of the stock and head in separate parts has the advantage of easy production and makes it possible to supply a head capable of fitting the stock of any machine. The stocks and heads are usually made of wrought iron while the core is made of steel, but any suitable material may be used for either. The preferred, and it is believed the most advantageous, form of connection is by a screw such as 13, but other connections could be adopted, provided a good centering is attained, for example the parts could be connected by small screws.

In Fig. 9 the chuck head 9 is shown screwed to a coupling member 15 designed to be screwed to a lathe spindle, not shown.

Another convenient arrangement for preventing rotation of the core in the bore is illustrated in Figs. 6 to 10, wherein the core is provided with a straight lateral longitudinal slot 10 into which projects the end of a screw or pin 11 mounted in the chuck head. The length of the slot 10 is preferably such that the longitudinal movement of the core is limited so that the latter cannot drop out at the ends of the bore 16 which is possible with the arrangement of the pins shown in Fig. 1.

The invention may be carried out in many ways, other than those above described as for example, the head 9 may be sufficiently large to permit of the formation of the centering recess 5 therein. The means for preventing the rotation of the core in the bore shown in Figs. 11 to 13, consists in forming in the periphery of the core a flat recess 18 into which projects an extension 17 formed on the stock.

By making the bore cylindrical and extending it entirely through the head the method of manufacture is greatly simplified and a perfect fitting of the parts, which is a very essential feature, is more easily accomplished than in known existing constructions.

We claim—

An automatically centering chuck comprising a stock having a tool centering aperture therein, a head detachably connected with the stock having a cylindrical bore extending therethrough perpendicular to the axis of the tool centering aperture, a cylindrical core mounted in the bore of substantially the same dimensions of the latter and provided with a tool receiving slot passing transversely through it and with a flat recess formed in a portion of its periphery, said recess adapted to receive an extension formed on the stock, said extension serving to prevent rotation of the core by engaging the bottom of the recess and to limit the longitudinal movement of the core in the bore by forming an abutment for the end walls of the recess, and a screw in the core wholly within the bore to clamp a tool against the walls of the transverse slot.

In testimony whereof we affix our signatures in presence of two witnesses.

BERNHARD BOMBORN.
ALEXANDER HOFFMANN.

Witnesses:
 WOLDEMAR HAUPT,
 HENRY HASPER.